(12) United States Patent       (10) Patent No.:     US 9,155,027 B1
Liu                             (45) Date of Patent:      Oct. 6, 2015

(54) 802.11 ENHANCED DISTRIBUTED CHANNEL ACCESS

(71) Applicant: Yong Liu, Campbell, CA (US)

(72) Inventor: Yong Liu, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/680,831

(22) Filed: Nov. 19, 2012

Related U.S. Application Data

(60) Provisional application No. 61/563,374, filed on Nov. 23, 2011, provisional application No. 61/638,390, filed on Apr. 25, 2012.

(51) Int. Cl.
*H04L 12/413* (2006.01)
*H04W 48/12* (2009.01)
*H04W 72/12* (2009.01)
*H04J 3/16* (2006.01)

(52) U.S. Cl.
CPC .............. *H04W 48/12* (2013.01); *H04L 12/413* (2013.01)

(58) Field of Classification Search
CPC ..... H04W 84/18; H04W 84/12; H04W 88/06; H04W 88/08; H04W 72/04; H04W 76/00; H04W 72/0446; H04W 72/0453; H04W 74/06; H04W 74/08; H04W 48/12; H04W 74/0816; H04W 74/0825; H04B 7/2643; H04B 7/2656
See application file for complete search history.

(56) References Cited

U.S. PATENT DOCUMENTS

| | | | | |
|---|---|---|---|---|
| 7,664,089 | B2* | 2/2010 | Zhao | 370/338 |
| 7,710,930 | B2* | 5/2010 | Kwak | 370/338 |
| 8,036,241 | B2* | 10/2011 | Ji et al. | 370/443 |
| 8,045,574 | B2* | 10/2011 | Sherman et al. | 370/445 |
| 8,121,108 | B2* | 2/2012 | Kwon et al. | 370/349 |
| 8,265,061 | B1* | 9/2012 | Smith et al. | 370/352 |
| 8,355,389 | B2* | 1/2013 | Kasslin et al. | 370/338 |

(Continued)

FOREIGN PATENT DOCUMENTS

| | | |
|---|---|---|
| EP | 1513295 | 3/2005 |
| EP | 1553730 A1 | 7/2005 |

(Continued)

OTHER PUBLICATIONS

PCT Internation Search Report and Written Opinon for related Application No. PCT/US2012/066246; Jan. 23, 2013; 5 pages.

(Continued)

*Primary Examiner* — Candal Elpenhord

(57) ABSTRACT

A method includes generating a first traffic indication map that announces a restricted access window. The method includes transmitting a first beacon, including the first traffic indication map, over a wireless medium and then transmitting a second beacon. The restricted access window begins after the first beacon and ends before the second beacon. The method includes, during the restricted access window, accessing the wireless medium using first channel access parameters; and after the restricted access window but before the second beacon, accessing the wireless medium using second channel access parameters. The first channel access parameters include a first short interframe space and a first slot time. The second channel access parameters include a second short interframe space equal to the first short interframe space and a second slot time. The second slot time and the first slot time are related by an integer multiple that is greater than one.

34 Claims, 17 Drawing Sheets

(56) References Cited

U.S. PATENT DOCUMENTS

| | | | |
|---|---|---|---|
| 8,411,699 B2* | 4/2013 | Ohmi | 370/445 |
| 8,468,615 B2* | 6/2013 | Tremp | 4/252.2 |
| 2003/0012163 A1 | 1/2003 | Cafarelli et al. | |
| 2004/0203979 A1 | 10/2004 | Attar et al. | |
| 2004/0218555 A1 | 11/2004 | Chen et al. | |
| 2005/0047386 A1 | 3/2005 | Yi | |
| 2005/0105504 A1 | 5/2005 | Sakoda | |
| 2006/0187964 A1 | 8/2006 | Li et al. | |
| 2007/0025244 A1* | 2/2007 | Ayyagari et al. | 370/229 |
| 2007/0041353 A1* | 2/2007 | Li et al. | 370/338 |
| 2007/0076675 A1 | 4/2007 | Chen | |
| 2007/0160021 A1 | 7/2007 | Xhafa et al. | |
| 2007/0217378 A1 | 9/2007 | Moorti et al. | |
| 2007/0280246 A1 | 12/2007 | Berkman et al. | |
| 2007/0286222 A1 | 12/2007 | Balasubramanian | |
| 2008/0144558 A1 | 6/2008 | Wentink | |
| 2008/0146253 A1 | 6/2008 | Wentink | |
| 2008/0151814 A1 | 6/2008 | Jokela | |
| 2008/0240049 A1* | 10/2008 | Gaur | 370/338 |
| 2008/0247376 A1* | 10/2008 | Del Prado Pavon et al. | 370/345 |
| 2008/0310391 A1 | 12/2008 | Schneidman et al. | |
| 2009/0010191 A1 | 1/2009 | Wentink | |
| 2009/0016306 A1 | 1/2009 | Wang et al. | |
| 2009/0109887 A1 | 4/2009 | Chandra et al. | |
| 2009/0196163 A1 | 8/2009 | Du | |
| 2009/0196212 A1 | 8/2009 | Wentink | |
| 2010/0165973 A1 | 7/2010 | Su et al. | |
| 2010/0192001 A1 | 7/2010 | Cornwall et al. | |
| 2010/0278088 A1 | 11/2010 | Goldman | |
| 2010/0309831 A1 | 12/2010 | Yeh et al. | |
| 2010/0315999 A1 | 12/2010 | Kakani et al. | |
| 2011/0026446 A1 | 2/2011 | Stacey | |
| 2011/0122780 A1 | 5/2011 | Nieminen et al. | |
| 2011/0176521 A1 | 7/2011 | Park et al. | |
| 2011/0268054 A1 | 11/2011 | Abraham et al. | |
| 2012/0106418 A1 | 5/2012 | Xhafa et al. | |
| 2012/0120858 A1 | 5/2012 | Das et al. | |
| 2012/0147800 A1 | 6/2012 | Park et al. | |
| 2012/0159001 A1 | 6/2012 | Liu et al. | |
| 2012/0219099 A1 | 8/2012 | Loukianov | |
| 2012/0263094 A1 | 10/2012 | Wentink | |
| 2012/0302184 A1 | 11/2012 | Zaitsu | |
| 2012/0315943 A1 | 12/2012 | Chu et al. | |
| 2013/0176902 A1 | 7/2013 | Wentink et al. | |
| 2013/0258931 A1 | 10/2013 | Gonikberg et al. | |
| 2014/0119268 A1 | 5/2014 | Chu et al. | |
| 2014/0153463 A1 | 6/2014 | Park et al. | |

FOREIGN PATENT DOCUMENTS

| | | |
|---|---|---|
| WO | WO-2008111496 A2 | 9/2008 |
| WO | WO-2012122119 A1 | 9/2012 |

OTHER PUBLICATIONS

Park, Miuyoung; IEEE P802.11; Jul. 2012; 32 pages.

Ghosh, Chittabrata et al.; Restricted Access Window Signaling for Uplink Channel Access; Jul. 16, 2012; 13 pages.

Liu, Siyang et al.; DCF Enhancements for Large Number of STAs; Sep. 15, 2011; 11 pages.

Revolution Wi-Fi The Wireless Professional's Connection for Independent Analysis; Wireless QoS Part 1—Background Information; Jul. 28, 2010; 11 pages.

Mangold, Stefan et al.; IEEE 802.11e Wireless LAN for Quality of Service; 2002; 8 pages.

PCT International Search Report for related Application No. PCT/US2013/044473; Oct. 29, 2013; 5 pages.

International Preliminary Report on Patentability in Int'l App. No. PCT/US2012/034091, mailed Oct. 31, 2013.

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

Stacey et al., "IEEE P802.11, Wireless LANs, Proposed TGac Draft Amendment," Institute of Electrical and Electronics Engineers, doc. No. IEEE 802.11-10/1361 r3 (Jan. 2011).

Stacey et al., "Specification Framework for TGac," document No. IEEE 802.11-09/0992r20, Institute tor Electrical and Electronics Engineers, pp. 1-49, Jan. 18, 2011.

IEEE Std 802.11 ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.

Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.

IEEE Std 802.11 af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

Yu, et al. "Coverage extension for IEEE802.11 ah," The Institute of Electrical and Electronics Engineers, doc. No. IEEE 802.11-11/0035r1, (Jan. 2011).

Taghavi et al., "Introductory Submission for TGah", doc. No. IEEE 802.11-11/0062r0, Institute tor Electrical and Electronics Engineers, pp. 1-5 (Jan. 14, 2011).

Zhang et al., "11 ah Data Transmission Flow," The Institute of Electrical and Electronics Engineers, doc. No. IEEE 802.11-11/1484r1, (Nov. 2011).

Vermani, et al. "Preamble Format for 1 MHz," The Institute of Electrical and Electronics Engineers, doc. No. IEEE 802.11-11/1482r2, (Nov. 2011).

Zhang et al., "1MHz Waveform in Wider BW", The Institute of Electrical and Electronics Engineers, doc. No. IEEE 802.11-12/0309r1, (Mar. 2012).

Vermani, et al. "Spec Framework Text for PHY Numerology," The Institute of Electrical and Electronics Engineers, doc. No. IEEE 802.11-11/1311 rO, (Sep. 2011).

Multi-Rate Layered Decoder Architecture for Block LDPC Codes of the IEEE 802.11n Wireless Standard; Kiran Gunnam, Gwan Choi, Welhuang Wang, and Mark Yeary; © 2007 IEEE. (4 pages).

IEEE Standard for Information technology—Telecommunications and information exchange between systems Local and metropolitan area networks—Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.

de Vegt, Rolf; Potential Compromise for 802.11ah Use Case Document; IEEE 802.11-11/0457r0; Mar. 2011; 27 pages.

IEEE P802.11ac/D2.0 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999ICor Jan. 2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer

(56) References Cited

OTHER PUBLICATIONS (PHY) extension in the 2.4 GHz band—Corrigendum 1 ," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11-2007 (revision of IEEE Std. 802.11-1999) "Information Standard for Information technology—Telecommunications and Information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search Report and Written Opinion in International Application No. PCT/US2012/034091 dated Nov. 27, 2012.

Low Power Capability Support for 802.11ah dated Jan. 17, 2011.

U.S. Appl. No. 61/475,776 dated Apr. 15, 2011.

Zhao, Liqiang et al.; Hybrid DCF Supporting Hybrid Antennas in a WLAN; IMACS Multiconference; Oct. 4-6, 2006.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999.

Park, Minyoung. "IEEE P802.11 Wireless LANs Proposed Specification Framework for TGah" TGac Spec Framework. 13 pages. Mar. 12, 2012.

\* cited by examiner

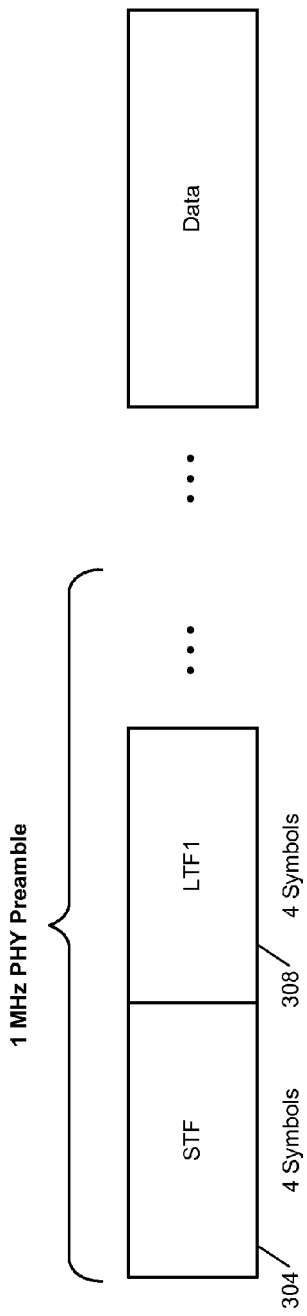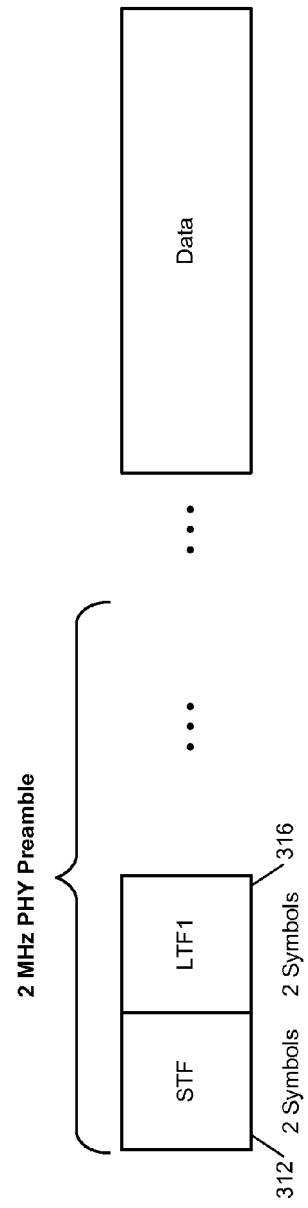

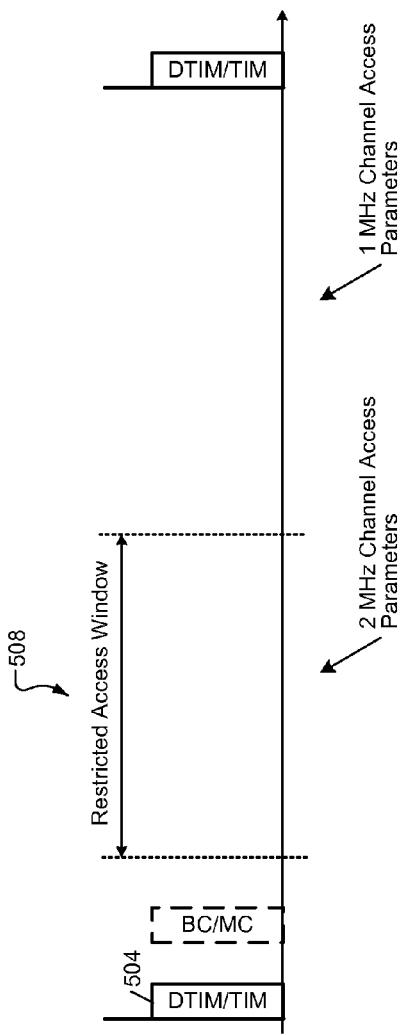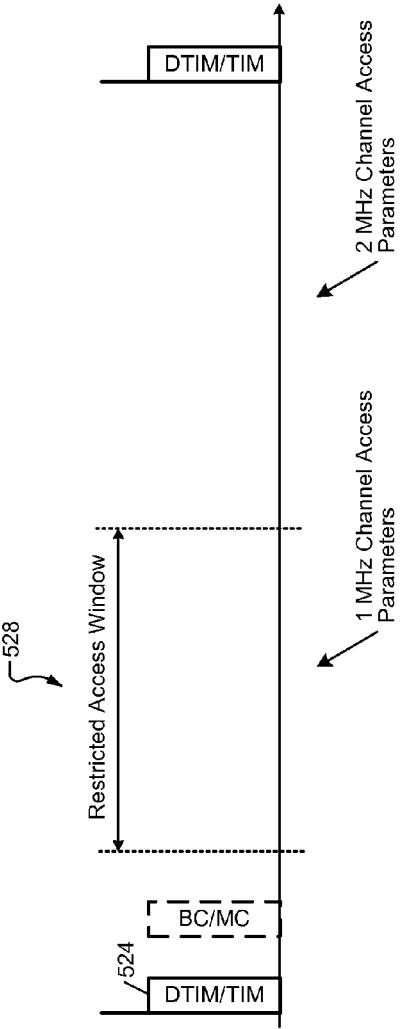

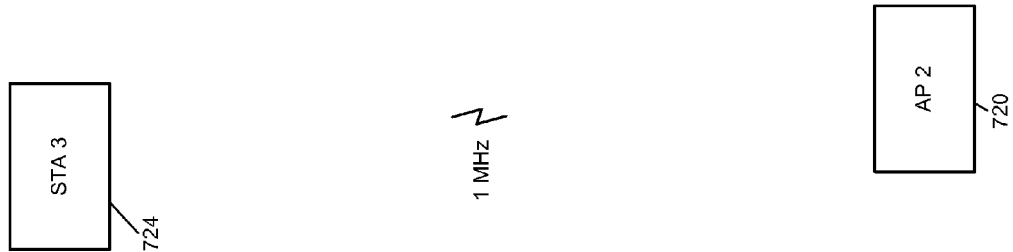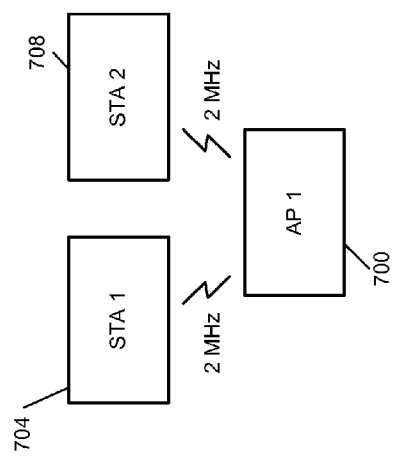
FIG. 8

802.11 ENHANCED DISTRIBUTED CHANNEL ACCESS

CROSS-REFERENCE TO RELATED APPLICATIONS

This present disclosure claims the benefit of U.S. Provisional Application No. 61/563,374, filed on Nov. 23, 2011, and U.S. Provisional Application No. 61/638,390, filed on Apr. 25, 2012. The entire disclosures of the applications referenced above are incorporated herein by reference.

FIELD

The present disclosure relates to wireless medium channel access, and more particularly to extensions to enhanced distributed channel access of IEEE 802.11.

BACKGROUND

In wireless local area networks, network devices communicate with each other over a wireless medium that is shared among the network devices. In such cases, in which a wireless medium is shared among multiple network devices, in order to avoid interference among respective transmissions of the network devices on the wireless medium, generally only one networking device should be permitted to transmit on the wireless medium at any given time. When transmissions interfere, such occurrences are commonly referred to as "collisions". According to IEEE Standard 802.11-2012, the entire disclosure of which is here incorporated by reference, a carrier sense multiple access with collision avoidance (CSMA/CA) scheme is therefore defined.

According to CSMA, prior to transmitting, a network device senses whether the wireless medium is busy—i.e., whether a carrier signal from another station's transmission is present on the wireless medium. If the wireless medium appears to be free based on carrier sensing, a collision avoidance scheme causes the networking device to select a randomized period of time to wait before transmitting. If the wireless medium remains free during this period of time, the network device begins transmitting upon conclusion of the period of time. The networking device expects to receive an acknowledgement from the destination of the transmission. If no acknowledgment is received, the network device may assume that a collision occurred and therefore attempt to retry transmission later, possibly after waiting for an even longer randomized period of time.

In FIG. 1, an example illustration of a collision avoidance scheme consistent with IEEE 802.11 is shown. At time 102, the medium ceases to be busy. A network device that desires to transmit will watch that the medium remains free until time 106, after a delay called the distributed coordination function (DCF) interframe space (DIFS). The network device chooses a random integer between zero and an upper limit, inclusive. This randomized integer may be referred to as a backoff number, a backoff delay, or a backoff interval. The network device then waits for the selected backoff interval and, assuming the medium remains free, begins transmitting.

In FIG. 1, if the randomly selected backoff interval is zero, the network device can begin transmitting at 106. If the backoff interval selected is one, the network device can begin transmitting at 110 after a time period referred to as a slot time. Similarly, if the backoff interval selected is two, the network device can begin transmitting at 114, two slot times after the end of DIFS at 106.

As FIG. 1 demonstrates, DIFS is made up of three time periods, two slot times and one short interframe space (SIFS). Because network devices will normally wait until at least 106 to begin transmitting, even if the selected backoff is zero, an access point can gain precedence over regular network devices by beginning transmission earlier than 106, such as at 118. The delay from time 102 until time 118 is called a point coordination function (PCF) interframe space (PIFS). As seen in FIG. 1, PIFS is formed from SIFS and one slot time.

In FIG. 2, an example transmission following the backoff interval is shown. At 150, a source transmits a request to send (RTS) to a destination. Following a SIFS, during which the destination processes the RTS and gets ready for transmission, the destination transmits a clear to send (CTS) frame at 154. When the source receives a CTS frame, the source knows that the destination successfully received the RTS frame and that a collision did not occur. Because the RTS frame is relatively short, the determination of whether a collision has occurred will be much quicker than if a long data frame experienced a collision. In addition, the CTS frame signals to other network devices, which may not have received the RTS from the source, that a transmission is expected and that the medium is busy.

At 158, after a further SIFS, the source begins transmission of data to the destination. At 162, following another SIFS, the destination transmits an acknowledgment to the source if the destination correctly received the data. At 166, the medium is once again free, and other network devices must wait for at least a period of DIFS until 170 before they can begin transmission. Between 150 and 170, any network devices that had a non-zero backoff would have deferred decrementing their backoff until 170. In other words, if another device had a remaining backoff of two at 150, that backoff would begin decrementing once again at 170. If the medium remains free, after an additional two slot times, the backoff will have decreased to zero and that network device can transmit.

In order to provide quality of service (QoS)—i.e., giving different priorities to different types of traffic—the collision avoidance scheme above, which is called the distributed coordination function (DCF), has been extended with a scheme called enhanced distributed channel access (EDCA). Under EDCA, two primary changes are made. The first is that DIFS is effectively lengthened for lower priority traffic. In addition, the average backoff interval for lower priority traffic is lengthened. The following table includes the four access categories defined for 802.11 QoS. The lowest priority is called background, while the highest priority is called voice.

| Access Category | AC Description | CWmin | CWmin e.g. | CWmax | CWmax e.g. | AIFSN |
|---|---|---|---|---|---|---|
| AC_BK | Background | aCWmin | 15 | aCWmax | 1023 | 7 |
| AC_BE | Best Effort | aCWmin | 15 | aCWmax | 1023 | 3 |
| AC_VI | Video | (aCWmin + 1)/2 − 1 | 7 | aCWmin | 15 | 2 |
| AC_VO | Voice | (aCWmin + 1)/4 − 1 | 3 | (aCWmin + 1)/2 − 1 | 7 | 2 |

When selecting a backoff interval, the network device selects a random number between 0 and an upper limit. The upper limit is called a contention window (CW) and is initialized to a value called CWmin. When a transmission fails, likely as a result of collision, the contention window is increased, up to a limit of CWmax. The above table demonstrates that the values of CWmin and CWmax are different for different access categories.

The CWmin and CWmax values are defined in terms of parameters aCWmin and aCWmax. Using example values of 15 for aCWmin and 1023 for aCWmax, examples of CWmin and CWmax for each access category are shown. For example, for video (AC_VI), the contention window begins at 7 where the backoff will be randomly selected from the range of 0 to 7, and after one or more retries, the backoff will be randomly chosen from the range of 0 to 15.

The above table also has a column for arbitration interframe space number (AIFSN), which specifies the minimum time that the medium must be free before the backoff interval begins. The arbitration interframe space (AIFS) is specified by the sum of SIFS and AISFN times the slot time. As seen in FIG. 3, the AIFS for an AIFSN of two is the same as DIFS from FIG. 1. The AIFS for an AIFSN of three is one slot time longer than DIFS. Similarly, the AIFS for an AIFSN of 7 is five slot times longer than DIFS. In other words, for best effort (AC_BE) frames, where the AIFSN is three, the earliest time a network device could transmit best effort data is at 204. If the selected backoff is one, best effort traffic could be transmitted starting at 208. Similarly, if the backoff is two, best effort traffic could begin transmitting at 212, etc.

Using background data (AC_BK) as an example, the contention window, using the example aCWmin and aCWmax values, increases from 15 to a maximum of 1023 as retransmissions are attempted. Once the contention window reaches CWmax, the contention window remains the same for any subsequent retries. Eventually, after a certain number of retries, transmission of that frame may be abandoned. The function that specifies how the contention window increases from CWmin to CWmax may be dependent on access category. One example function, which is nearly equivalent to doubling, is (CW+1)*2−1. In other words, the contention window begins at 15 and, after an unsuccessful transmission, the CW increases to 31. After another failed transmission attempt, the contention window increases to 63, etc.

Referring again to FIG. 3, it can be observed that the total delay from the medium becoming free until a transmission begins can be expressed in terms of SIFS plus a number of slot times. SIFS is based on the nominal time that the medium access control (MAC) and physical layer interface (PHY) require in order to receive the last symbol of a frame at the air interface, process the frame, and respond with the first symbol on the air interface of the earliest possible response frame. IEEE 802.11-2012, section 6.5.4.2.

The slot time is based on four values: aMACProcessingDelay, aAirPropagationTime, aRxTxTurnaroundTime, and aCCATime. The aMACProcessingDelay value is the maximum time available for the MAC to request a transmission from the PHY after learning of the end of a reception by the PHY. The aAirPropagationTime is twice the propagation time required for a signal to cross the distance between the most distant allowable network devices. The aRxTxTurnaroundTime is the maximum time required by the PHY to change from receiving to transmitting. The aCCATime is the maximum time that a clear channel assessment (CCA) mechanism has available to determine whether the medium is busy or idle. See IEEE 802.11-2012, section 6.5.4.2. For purposes of illustration only, examples of these values in the 5 GHz band are 9 is for slot time, 16 μs for SIFS, and 4 μs for aCCATime.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

A wireless access point includes a medium access control (MAC) circuit and a physical layer device. The MAC circuit is configured to generate a first traffic indication map. The first traffic indication map announces a restricted access window. The physical layer device is configured to transmit a first beacon over a wireless medium. The first beacon includes the first traffic indication map. The restricted access window begins subsequent to transmission of the first beacon. The restricted access window ends prior to transmission of a second beacon. The second beacon is transmitted subsequent to the first beacon with no intervening beacons.

The physical layer device is configured to, during the restricted access window, access the wireless medium using a first set of channel access parameters. The first set of channel access parameters includes a first short interframe space and a first slot time. The physical layer device is configured to, subsequent to the restricted access window but prior to the transmission of the second beacon, access the wireless medium using a second set of channel access parameters. The second set of channel access parameters includes a second short interframe space and a second slot time. The first short interframe space and the second short interframe space are equal. The second slot time and the first slot time are related by an integer multiple, and the integer multiple is greater than one.

A method of operating a wireless access point includes generating a first traffic indication map. The first traffic indication map announces a restricted access window. The method includes transmitting a first beacon over a wireless medium. The first beacon includes the first traffic indication map. The restricted access window begins subsequent to transmission of the first beacon. The method includes transmitting a second beacon subsequent to the first beacon with no intervening beacons. The restricted access window ends prior to transmission of the second beacon.

The method includes, during the restricted access window, accessing the wireless medium using a first set of channel access parameters. The first set of channel access parameters includes a first short interframe space and a first slot time. The method includes, subsequent to the restricted access window but prior to the transmission of the second beacon, accessing the wireless medium using a second set of channel access parameters. The second set of channel access parameters includes a second short interframe space and a second slot time. The first short interframe space and the second short interframe space are equal. The second slot time and the first slot time are related by an integer multiple and the integer multiple is greater than one.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 4A and 4B are graphical illustrations of physical layer preambles for 1 MHz and 2 MHz transmissions.

FIGS. 6A-6D are timing diagrams of restricted access windows used for specifying channel access parameters.

FIG. 8 is a graphical illustration of relative network device proximity.

DESCRIPTION

Figure 1:
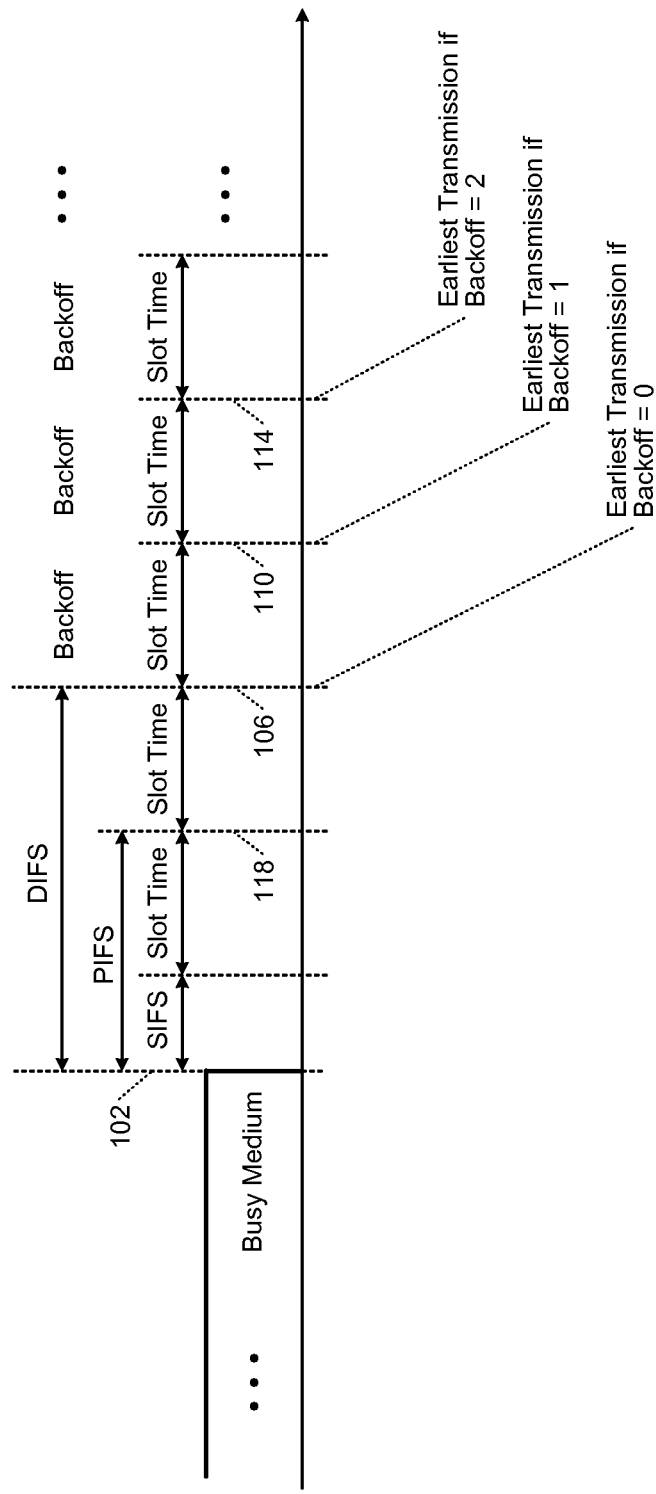
FIG. 1 is a graphical illustration of channel access timing parameters according to the prior art.
Figure 2:
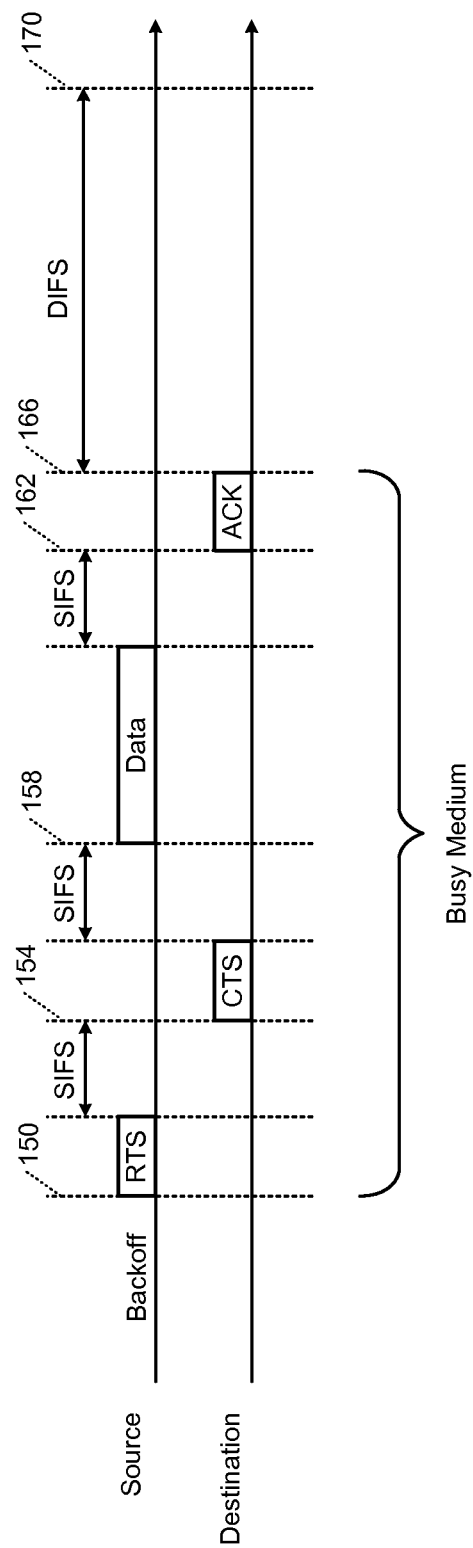
FIG. 2 is a graphical illustration of a timeline of an example transmission according to the prior art.
Figure 3:
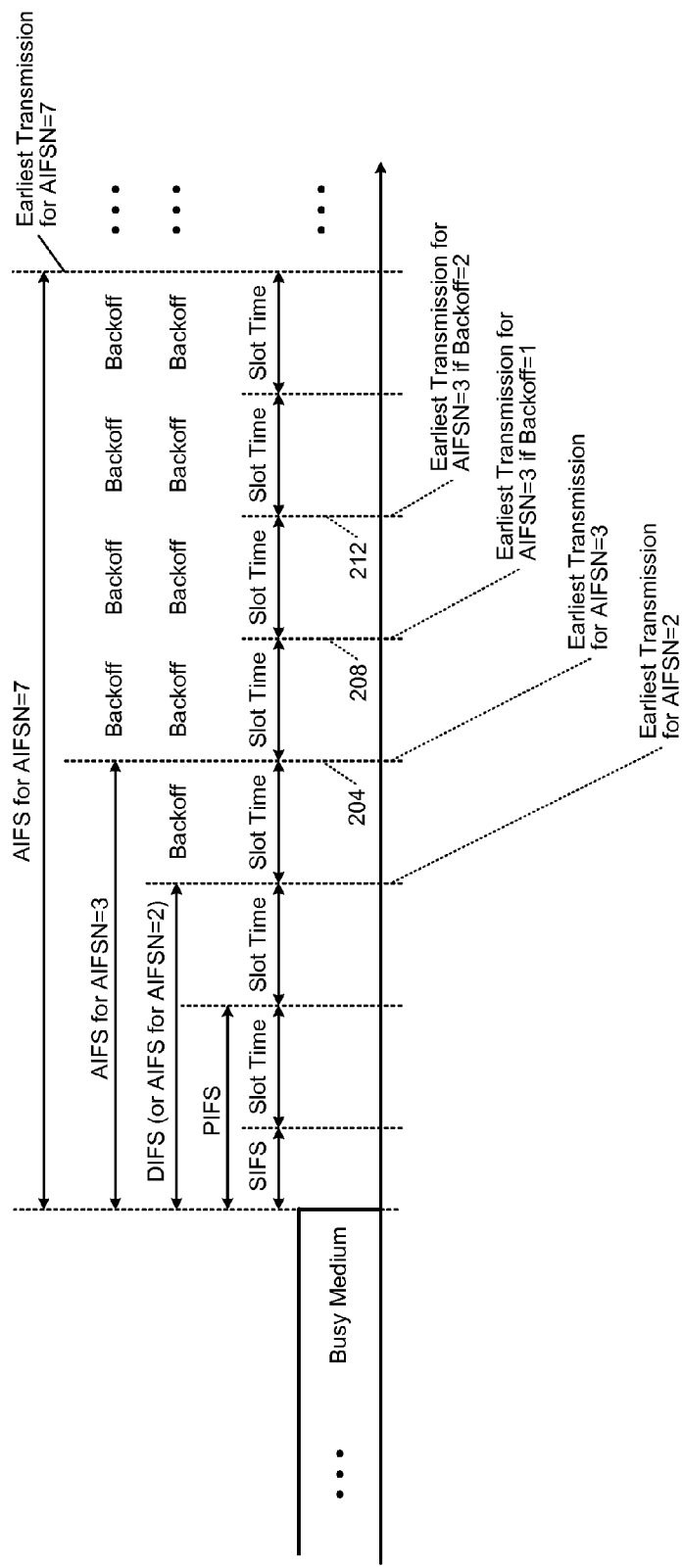
FIG. 3 is a graphical illustration of channel access timing parameters relating to quality of service according to the prior art.

For different physical layer interfaces (PHYs), various PHY timing parameters may be different. For example, IEEE Standard 802.11ah (currently in the process of being drafted) may specify a 1 MHz channel PHY and a 2 MHz channel PHY. The clear channel assessment (CCA) time, known as aCCATime, may be different for these two PHYs. This will result in the short interframe space (SIFS) intervals, as well as the slot times, being different for the PHYs.

For purposes of illustration only, the preamble of a 1 MHz PHY (see FIG. 4A) may have a 4-symbol short training field (STF) 304, where each symbol is 40 μs long, while the preamble of a 2 MHz PHY (see FIG. 4B) may have a 2-symbol short training field 312. The symbols in the 2 MHz PHY preamble may also be 40 μs in length. The aCCATime may be based on the time required to receive half of a short training field and may therefore be approximately 40 μs for the 2 MHz PHY and 80 μs for the 1 MHz PHY. Because of the longer aCCATime, the 1 MHz PHY will have a longer SIFS as well as longer slot times. When the 1 MHz and 2 MHz PHYs are sharing the same wireless channel, 2 MHz transmissions are more likely to occur than 1 MHz transmissions because the channel access times are on average shorter for the 2 MHz transmissions. This may lead to higher priority data transmitted using the 1 MHz PHY receiving a worse quality of service (QoS) than lower priority data sent using the 2 MHz PHY.

One approach is to use the longer 1 MHz channel access times (SIFS and slot times) for both 1 MHz and 2 MHz transmissions. However, this causes all 2 MHz transmissions to be delayed, even if there are no 1 MHz transmissions pending. Therefore, in situations where 1 MHz traffic is not present, an access point (AP) may allow network devices (also known as stations or STAs) to make 2 MHz transmissions using shorter channel access times specific to the 2 MHz PHY.

When 1 MHz transmissions are present, comparable quality of service for the same access category (i.e., QoS priority) between 1 MHz and 2 MHz PHYs can be achieved by using channel access parameters based on the 1 MHz PHY requirements. The channel access parameters include the arbitration interframe space (AIFS) for each access category and contention window parameters for each access category. The channel access parameters can be made the same by using the same SIFS and slot times for both 1 MHz and 2 MHz transmissions.

Alternatively, the slot times for 2 MHz transmissions can be made shorter than the slot times for the 1 MHz transmissions, and the AIFS and contention windows can be equalized by increasing the multipliers (AISFN, aCWmin, and aCWmax) for 2 MHz transmission with respect to 1 MHz transmissions. In other words, if the 2 MHz slot time is half as long as the 1 MHz slot time, the AIFSNs for 2 MHz transmissions may be doubled with respect to 1 MHz transmissions. Because the AIFS is the product of AIFSN and slot time, the halving and doubling cancel out, resulting in the same AIFS for each access category between 1 MHz and 2 MHz transmissions.

In situations where 2 MHz channels may be plentiful, such as the United States, 2 MHz transmissions may be more common than 1 MHz transmissions. Further, 1 MHz transmissions are generally used for longer range transmission, and may therefore be less likely to interfere with 2 MHz transmissions. In such circumstances, 2 MHz transmissions may be conducted using the shorter channel access parameters specific to 2 MHz transmissions.

Another approach to resolving conflicts between 1 MHz and 2 MHz PHYs is to time-multiplex the wireless channel. For example only, a restricted access window can be used, as described in detail in commonly assigned application Ser. No. 13/680,876, filed Nov. 19, 2012, and titled "802.11 Restricted Access Windows", the entire disclosure of which is here incorporated by reference.

The AP may specify a restricted access window following a beacon, where 1 MHz channel access parameters are used during the restricted access window period. Outside of the restricted access window, 2 MHz channel access parameters are used. This may mean that 1 MHz transmissions are constrained to only occur within the restricted access window. Alternatively, the restricted access window could be specified to use 2 MHz channel access parameters, meaning that 1 MHz transmissions would not occur during the restricted access window. Outside of the restricted access window, 1 MHz times would then be used. 2 MHz transmissions may be allowed as long as the 2 MHz transmissions were performed using 1 MHz channel access parameters.

In FIG. 4A, an example 1 MHz PHY preamble is shown. The preamble includes a short training field (STF) 304 with four symbols and a first long training field (LTF) 308, also with four symbols. For example only, each symbol may be 40 μs in length.

In FIG. 4B, an example 2 MHz PHY preamble is shown. The preamble includes a short training field (STF) 312 with two symbols and a first long training field (LTF) 316, also with two symbols. For example only, each symbol may be 40 μs in length.

Because a clear channel assessment (CCA) may require receiving half of a short training field, the aCCATime for the 1 MHz PHY preamble may be approximately two symbols multiplied by 40 μs, or 80 μs. Meanwhile, the aCCATime for the 2 MHz PHY preamble may be one symbol multiplied by 40 μs, or 40 μs.

For purposes of illustration only, assume that the minimum slot time for 2 MHz transmissions, based on the 2 MHz aCCATime of 40 μs, is 90 μs. Also assume that the minimum slot time for 1 MHz transmissions, based on the 80 μs aCCATime, is 130 μs. In order to synchronize 1 MHz and 2 MHz slot times, the slot time for 1 MHz transmissions can be made an integer multiple of the slot time for 2 MHz transmissions. Note that the aCCATime is the minimum time needed to make a clear channel assessment. Therefore, the slot time can be increased beyond the minimum required by aCCATime. The 1 MHz slot time may therefore be increased to 180 μs, which is double the 2 MHz slot time of 90 μs.

Figure 5A:
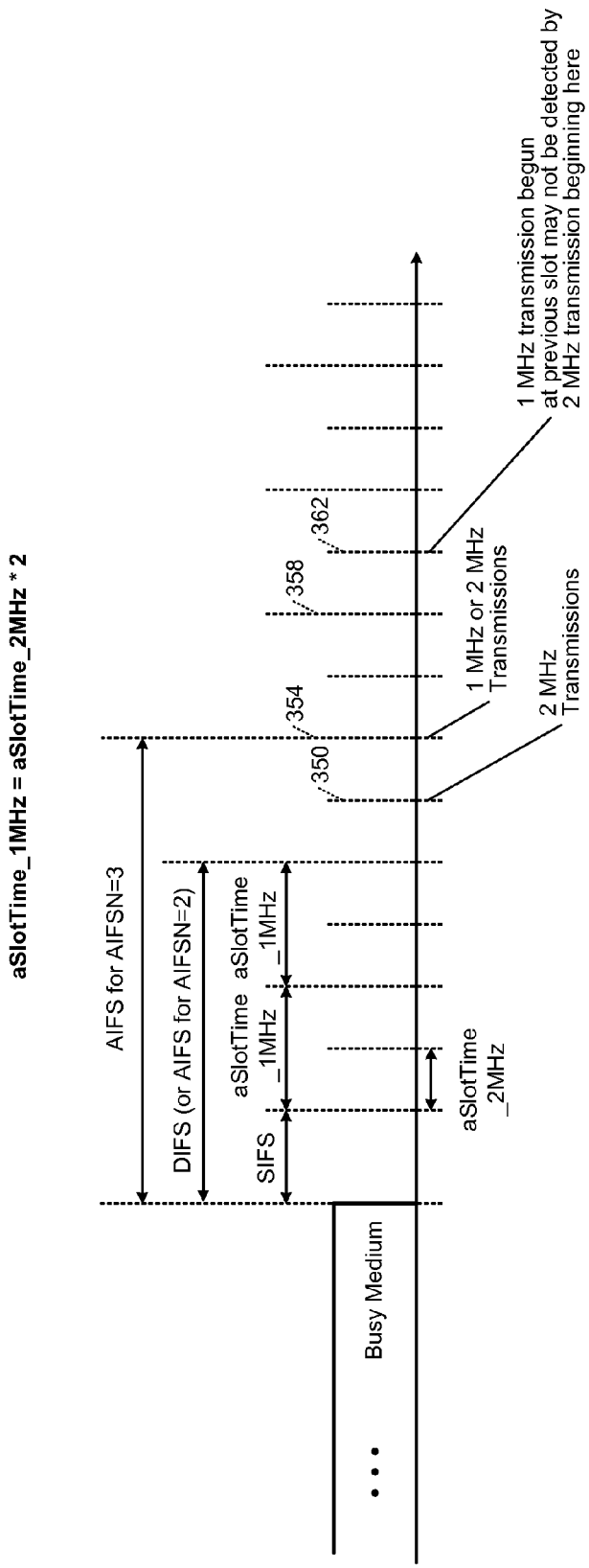
FIGS. 5A-5C are graphical illustrations of channel access timing for mixed 1 MHz and 2 MHz transmissions.

In FIG. 5A, an example is shown where the 1 MHz slot time is twice that of the 2 MHz slot time. Note that AIFS for an AIFSN of two can be expressed as SIFS plus two 1 MHz slot times or SIFS plus four 2 MHz slot times. Similarly, AIFS for an AIFSN of three can be expressed as SIFS plus three 1 MHz slot times or SIFS plus six 2 MHz slot times. After the AIFS for the appropriate access category, random backoff for 2 MHz transmissions can be counted using 2 MHz slot times. Because the 2 MHz slot times are half the size of 1 MHz slot times, the contention window values for 2 MHz transmissions should be doubled. In this way, the actual lengths of contention windows will be the same between 1 MHz and 2 MHz transmissions for the same access category.

At 2 MHz slot times such as 350, only 2 MHz transmissions can begin. At 1 MHz slot times, such as 354, 1 MHz transmissions can begin and, because the slot times are multiple of each other, 2 MHz transmissions can also begin. Note that when both 1 MHz and 2 MHz transmissions are present, there may be situations in which they conflict. For example, if a 1 MHz transmission is begun at 358, a station backing off until 362 before making a 2 MHz transmission may not have observed the 1 MHz transmission beginning at 358 by the time the 2 MHz transmission begins at 362. This situation will likely result in a collision.

Figure 5B:
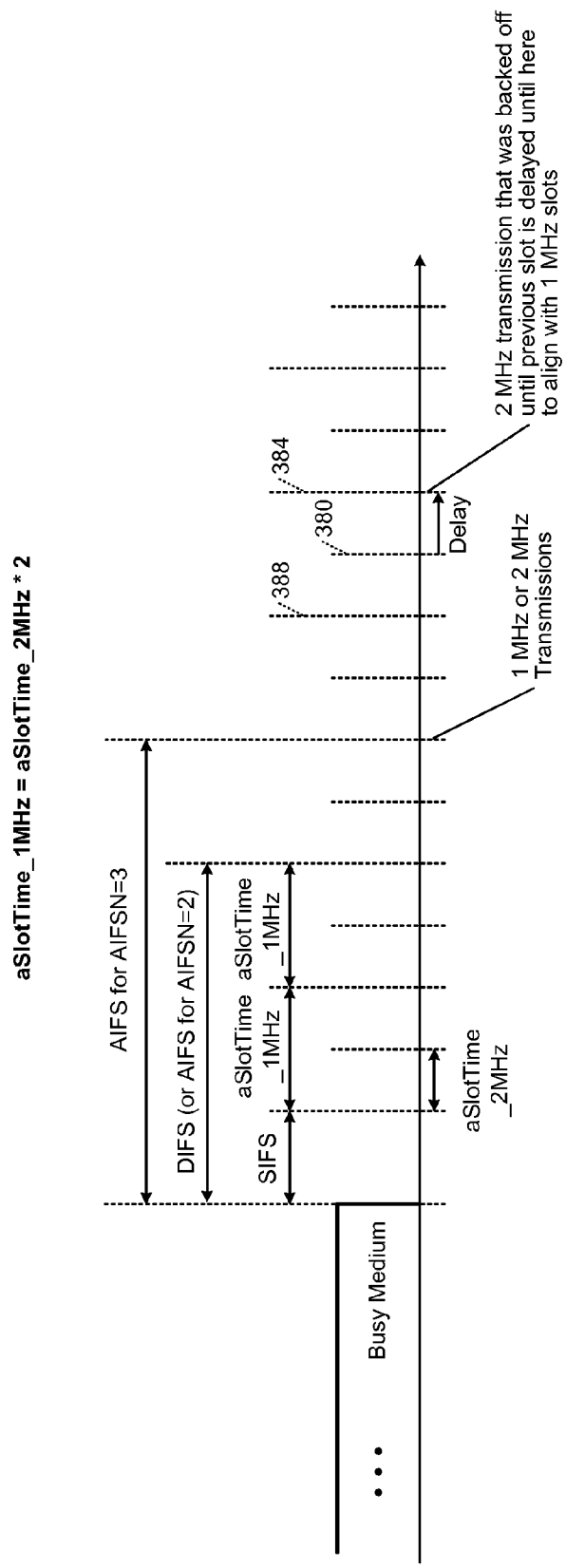

FIG. 5B shows one approach to eliminating this sort of collision: prevent 2 MHz transmissions from beginning at 2 MHz slot times that do not line up with 1 MHz slot times. In other words, if the random backoff for a 2 MHz transmission would cause the 2 MHz transmission to begin at 380, an additional 2 MHz slot time may be added to the backoff interval to delay the 2 MHz transmission until 384. As a result, if a 1 MHz transmission had begun at 388, the transmission at 384 would be deferred because there was sufficient time to detect the 1 MHz transmission beginning at 388.

Figure 5C:
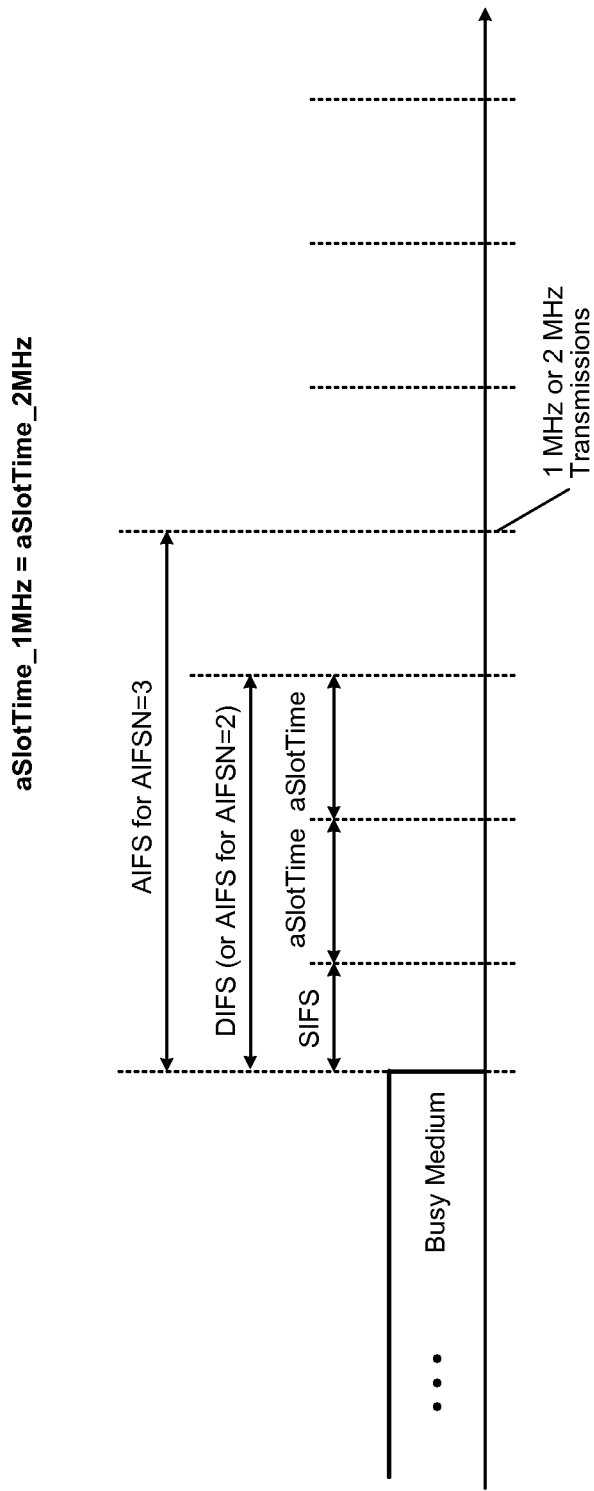

In FIG. 5C, another implementation is shown where the 1 MHz and 2 MHz slot times are set to be equal to each other. Assuming that the SIFS is also set equal between the 1 MHz and 2 MHz transmissions, the equal slot times will mean that the AIFS values will line up for the same access category across 1 MHz and 2 MHz transmissions.

The SIFS and aSlotTime may be defined in units of symbols or half symbols instead of in units of absolute time, such as microseconds or tens of microseconds. For example, with a symbol duration of 40 μs, a SIFS of 80 μs could be defined as 2 symbols or as 4 half-symbols. This may require fewer bits than encoding the number 80. Further, the duration of a transmission sequence is based on a series of physical layer convergence procedure (PLCP) Protocol Data Units (PPDUs) and associated interframe spaces and can therefore be expressed as an integer number of symbols. Using units of symbols or half-symbols may allow for a frame's duration field to use fewer bits.

In various implementations, 1 MHz transmissions may be restricted to have at most one data exchange at a time. This may be achieved by setting a transmission opportunity (TXOP) field to zero, for all access categories, in 1 MHz transmissions.

Figure 5D:
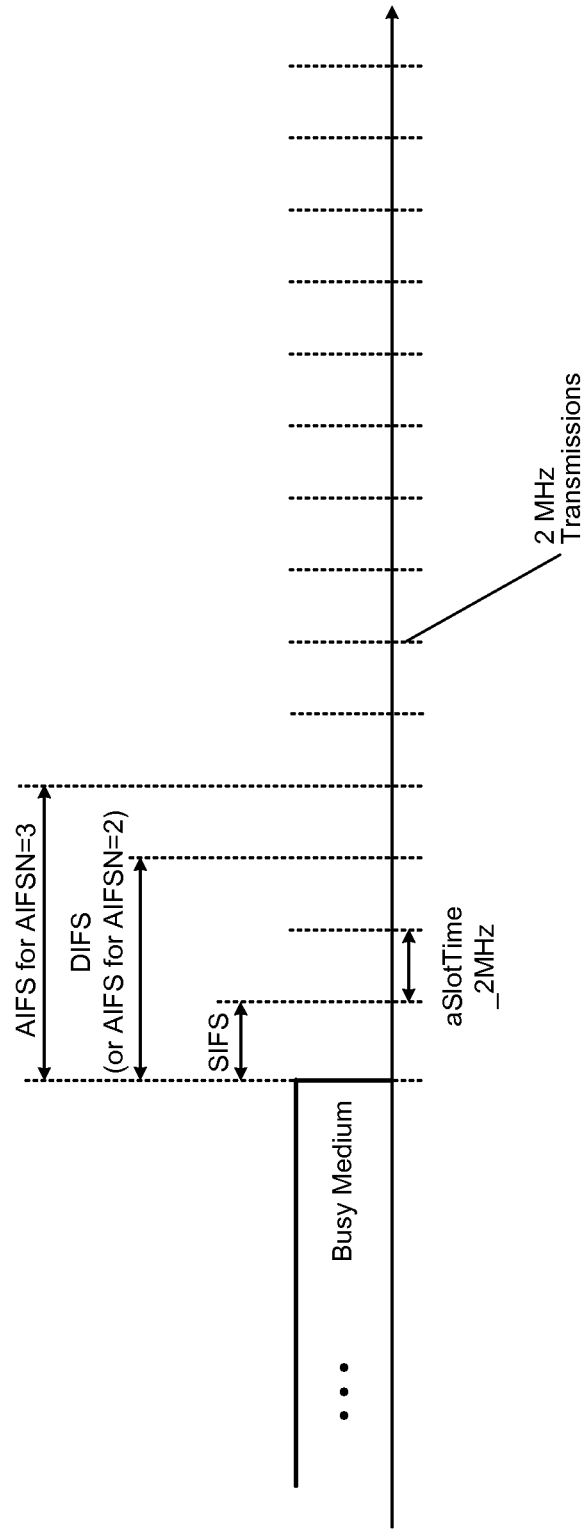
FIG. 5D is a graphical illustration of channel access timing for 2 MHz transmissions.

In FIG. 5D, an example is shown where channel access parameters specific to 2 MHz transmissions are used. The SIFS may be shorter when only the aCCATime of 2 MHz transmissions needs to be considered. In addition, the AIFS may be set based on the shorter 2 MHz slot times. As a result, the AIFS for a given access category of data is reduced when compared to the mixed PHY situations of FIGS. 5A-5C.

Figure 6A:
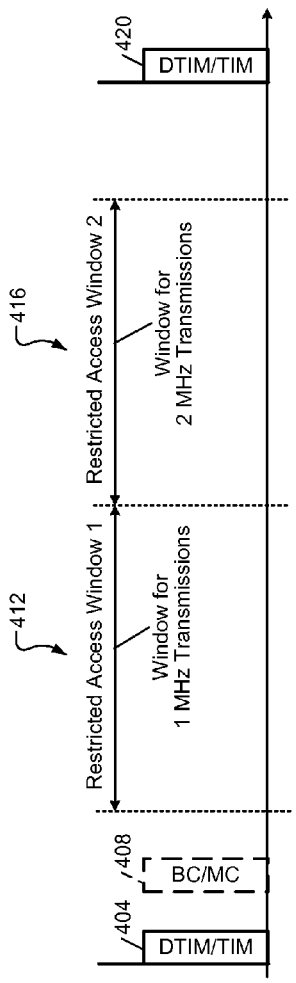

In FIG. 6A, a traffic indication map (TIM) or delivery traffic indication map (DTIM) beacon 404 establishes one or more restricted access windows. The DTIM may be followed by a period 408 where if any broadcast or multicast packets are queued for transmission by the AP, the broadcast and multicast packets are transmitted.

Following the broadcast/multicast window 408, a first restricted access window (RAW) 412 begins. During the first RAW 412, 1 MHz channel access parameters are used and therefore 1 MHz transmissions are allowed. The first RAW 412 is followed by a second RAW 416, during which 2 MHz channel access parameters are used. After the second RAW 416 concludes, stations may revert to the default channel access parameters established by the AP, which may be the same as those in the first RAW 412, those in the second RAW 416, or a different set of access parameters.

The first RAW 412 may be restricted to only 1 MHz transmissions. This may be because the AP desires to give 1 MHz transmissions a chance to occur without conflicting with 2 MHz transmissions. Additionally or alternatively, the channel access parameters used in the first RAW 412 of FIG. 6A may not be synchronized with 2 MHz channel access parameters. For example only, the slot time used in the first RAW for 1 MHz transmissions may not be an integer multiple of the slot time used in the second RAW 416 for 2 MHz transmission.

Note that the first RAW 412 begins subsequent to transmission of the beacon 404. The second RAW 416 begins subsequent to or coincident with the end of the first RAW 412. Both the first RAW 412 and the second RAW 416 end before transmission of a second beacon 420. Note that the second beacon 420 is the beacon transmitted directly subsequent to the beacon 404, there being no intervening beacons between the beacon 404 and the second beacon 420. In various implementations, beacons are not transmitted during RAWs. Therefore, RAWs may be scheduled to end before an approximate target beacon transmission time (TBTT) so that transmission of a beacon is not delayed while waiting for a RAW to end.

Figure 6B:
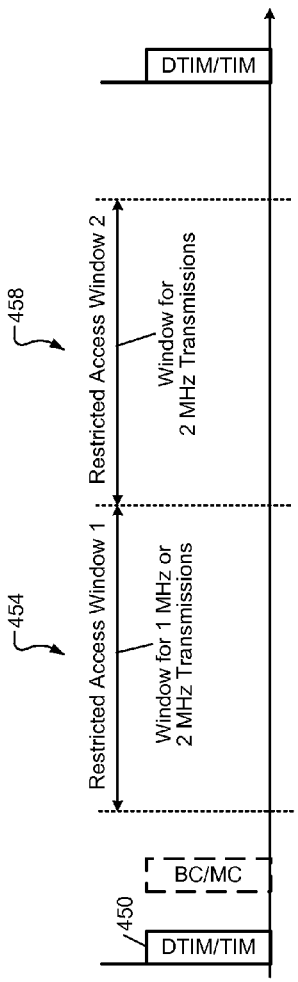

In FIG. 6B, a DTIM 450 establishes a first RAW 454 during which 1 MHz channel access parameters are used. The 1 MHz channel access parameters are synchronized with 2 MHz channel access parameters and therefore either 1 MHz or 2 MHz transmissions may occur within the first RAW 454. Returning now to FIG. 6B, a second RAW 458 follows the first RAW and may use the same channel access parameters as the second RAW 416 of FIG. 6A. In FIG. 6A, the timing of the first RAW 412 and the second RAW 416 may be reversed such that 2 MHz transmissions occur first. Similarly, in FIG. 6B, the second RAW 458 may be reversed with the first RAW 454. This order may be determined dynamically by the AP or may be predefined by a standard.

In FIG. 6C, a DTIM 504 establishes a single RAW 508. Within the RAW 508, 2 MHz channel access parameters are used. Once the RAW 508 ends, 1 MHz channel access parameters are used. To allow 2 MHz transmissions outside of the RAW 508, the 1 MHz channel access parameters are synchronized with 2 MHz channel access parameters.

Alternatively, in FIG. 6D, a DTIM 524 specifies a RAW 528 during which 1 MHz channel access parameters are used. Outside of the RAW 528, 2 MHz channel access parameters are used. The RAW 528 may be restricted to only 1 MHz transmissions, in which case the channel access parameters used within the RAW 528 may be unsynchronized with 2 MHz transmissions. This may allow for shorter slot times than if the 1 MHz slot times needed to be an integer multiple of the 2 MHz slot times for synchronization purposes.

Figure 7C:
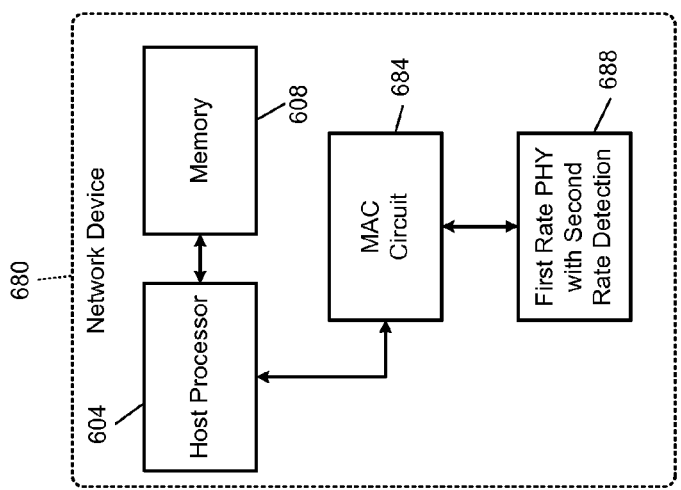
FIGS. 7A-7C are functional block diagrams of a network device.
Figure 7B:
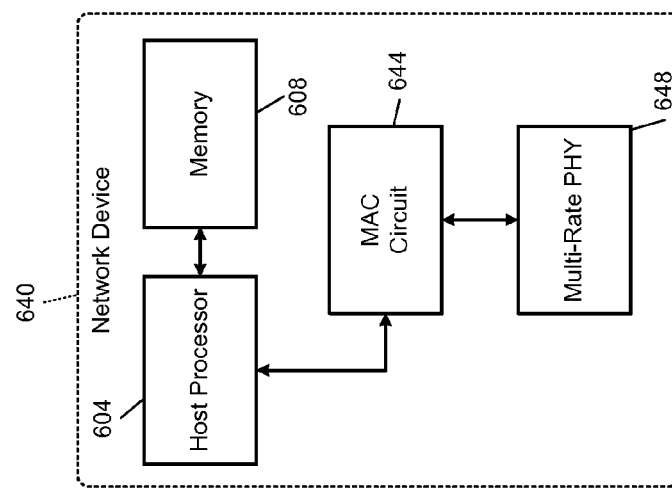
Figure 7A:
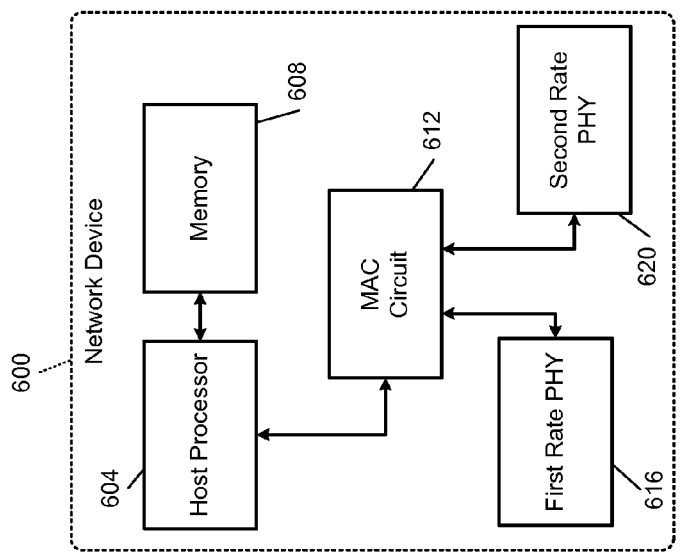

In FIG. 7A, a network device 600 includes a host processor 604 that interfaces with memory 608. The host processor 604 sends data to and receives data from a medium access control (MAC) circuit 612. The MAC circuit 612 communicates with a wireless medium using a first rate physical layer interface (PHY) 616 and also interacts with the wireless medium using a second rate PHY 620. For example only, the first rate PHY 616 may operate with 1 MHz channels, while the second rate PHY 620 may operate with 2 MHz channels. A 1 MHz channel may span the higher frequency half of a 2 MHz channel or the lower frequency half of the 2 MHz channel.

In FIG. 7B, a network device 640 includes a host processor 604 and a memory 608, which may be configured similarly to the host processor 604 and the memory 608 of FIG. 7A. The host processor 604 sends data to and receives data from a MAC circuit 644. The MAC circuit 644 communicates with a physical layer medium using a multi-rate PHY 648, which may support both 1 MHz and 2 MHz channel communication.

In FIG. 7C, a network device 680 includes a host processor 604 and a memory 608, which may be configured similarly to the host processor 604 and the memory 608 of FIGS. 7A and 7B. The host processor 604 sends data to and receives data from a MAC circuit 684. The MAC circuit 684 communicates with a wireless medium using a first rate PHY 688. The first rate PHY 688 sends and receives data using a first rate but may be able to detect transmissions made using a second rate. This may allow the first rate PHY 688 to avoid collisions and may also inform the first rate PHY 688 and the MAC circuit 684 of what channel access parameters are appropriate to use in the surrounding environment.

In alternative implementations, the first rate PHY 688 may lack any explicit second rate detection. The first rate PHY 688 would therefore rely on an expected lack of interference from the second rate. The first rate PHY 688 may, in various implementations, rely on inherent though imperfect detection of channel usage by second rate transmissions while using the first rate channel usage detection mechanisms.

In FIG. 8, graphical illustration of relative network device proximity is shown. A first AP 700 forms an infrastructure basic service set (BSS) with a first station 704 and a second station 708. The first AP 700 communicates with the first station 704 and the second station 708 using a 2 MHz channel. Meanwhile, 1 MHz communication, which may be used over long distances, such as 1 km, is used between a second AP 720 and a third station 724.

In certain situations, the first AP 700 and the first and second stations 704 and 708 may be able to ignore the 1 MHz transmissions between the second AP 720 and the third station 724 because those 1 MHz transmissions are geographically remote. The first and second APs 700 and 720 and the first, second, and third stations 704, 708, and 724 may each be generally implemented by one or more of the network devices in FIGS. 7A-7C.

Figure 9:
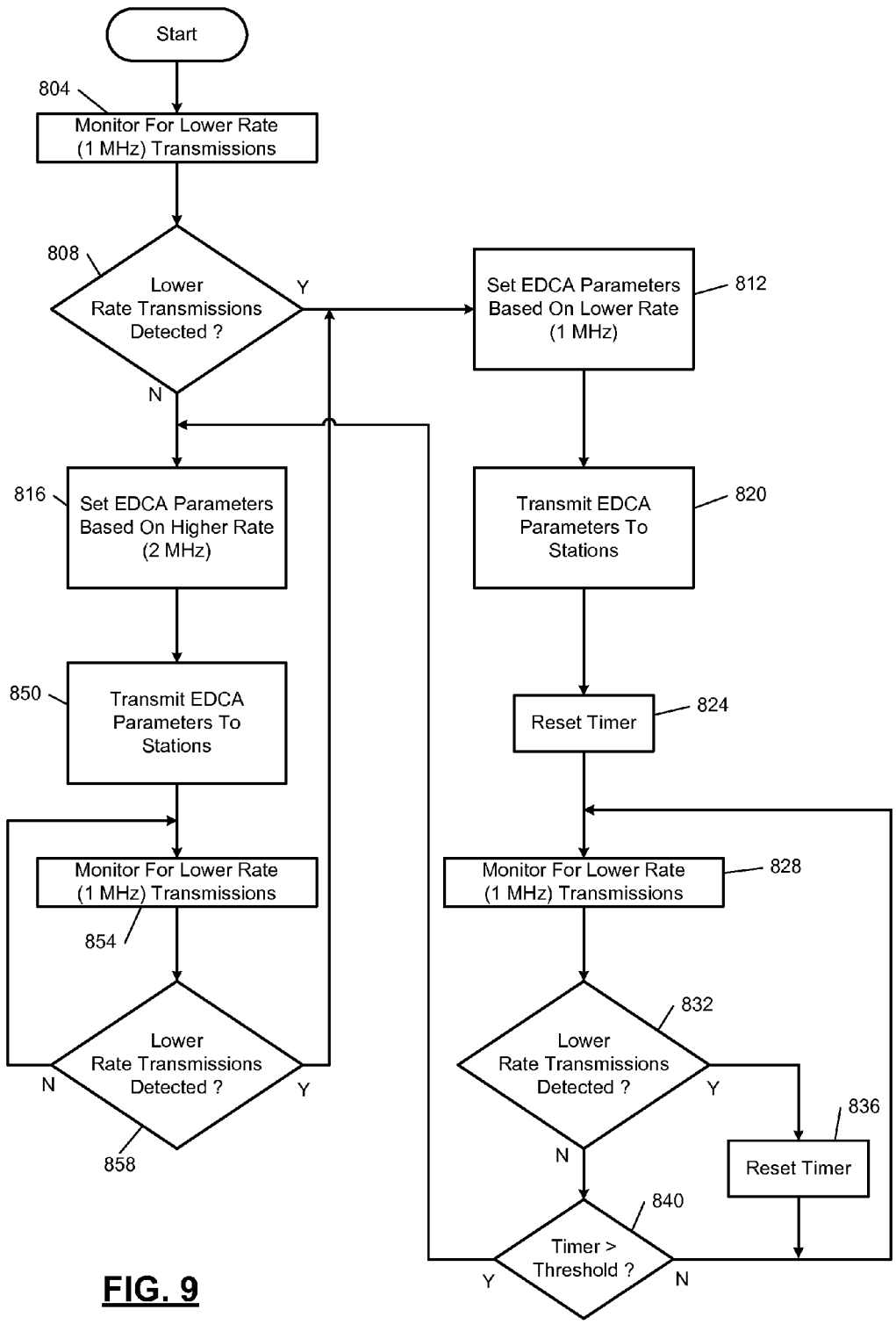
FIGS. 9 and 10 are flowcharts of example access point operation.

In FIG. 9, a flowchart of example access point operation starts at 804, where the AP monitors for lower rate transmissions, such as 1 MHz transmissions. Control continues at 808 where, if lower rate transmissions are detected, control transfers to 812; otherwise, control transfers to 816. At 812, control sets channel access parameters based on the lower rate and continues at 820 where the channel access parameters are transmitted to stations. Control continues at 824, where a timer is reset. The timer keeps track of how long it has been since lower rate transmissions were observed.

Control continues at 828, where control monitors for lower rate transmission. Control continues at 832, where if lower rate transmissions are detected, control transfers to 835; otherwise, control transfers to 840. At 836, control resets the timer and continues at 828. At 840, if the timer exceeds the threshold, lower speed transmissions have not been detected for that threshold amount of time and control transfers to 816; otherwise, control returns to 828 to continue monitoring for lower rate transmissions.

At 816, control sets channel access parameters based on the higher rate and continues at 850 where the channel access parameters are transmitted to the station. Control continues at 854 and monitors for lower rate transmissions. At 858, if lower rate transmissions are detected, control transfers to 812; otherwise, control returns to 854 to continue monitoring for lower rate transmissions.

Figure 10:
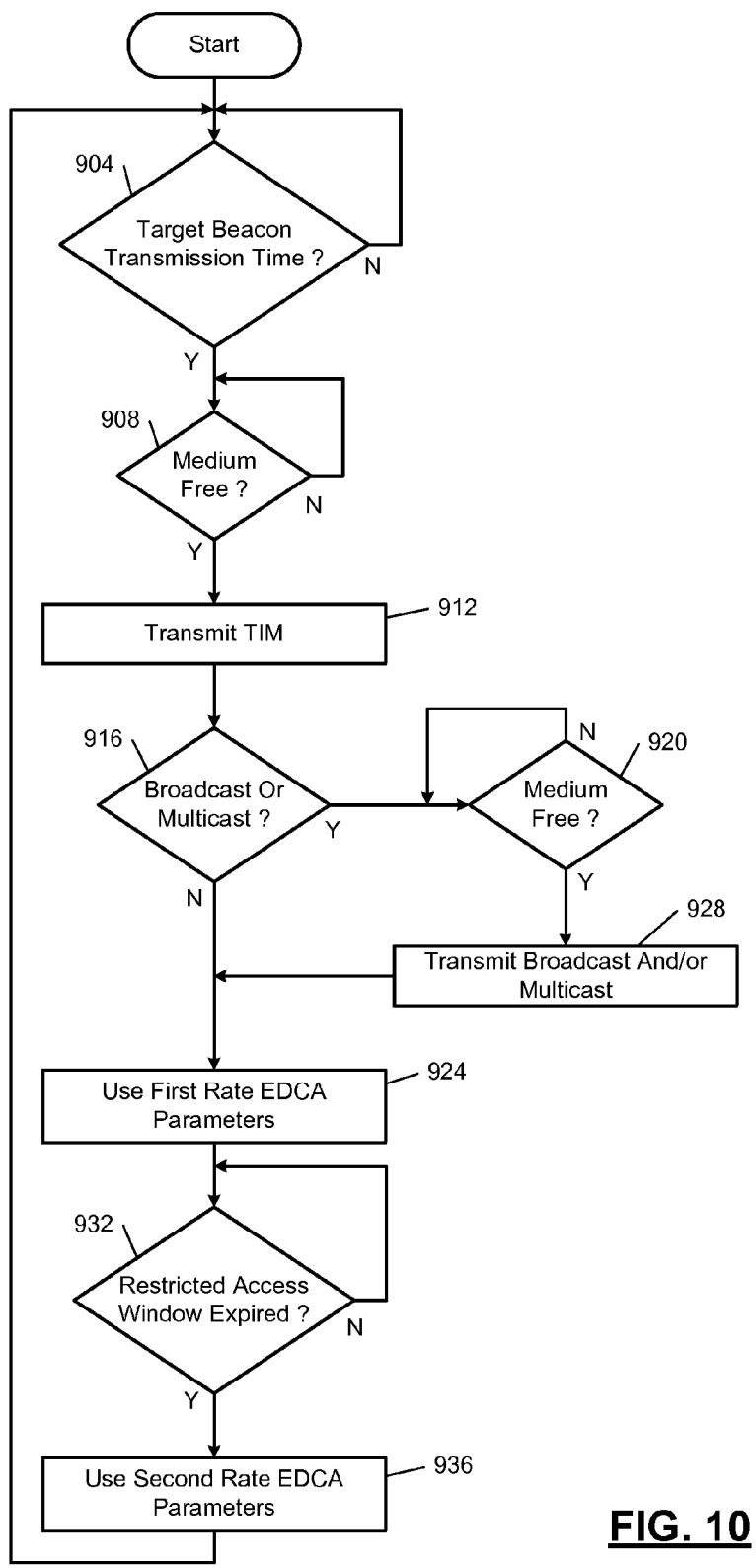

In FIG. 10, another flowchart depicts example AP operation using restricted access windows. Although one restricted access window is demonstrated in FIG. 10, more restricted access windows may be defined and used. Control begins at 904, where if the target beacon transmission time has been reached, control transfers to 908; otherwise, control remains at 904. At 908, control determines whether the wireless medium is free. If so, control continues at 912; otherwise, control remains at 908. At 912, control transmits a traffic indication map (TIM), which may be a delivery traffic indication map (DTIM).

The DTIM may indicate whether broadcast or multicast data is queued. Control continues at 916, where if broadcast or multicast data is queued, control transfers to 920; otherwise, control continues at 924. At 920, control waits until the medium is free and then transfers to 928. At 928, control transmits the queued broadcast or multicast data, and continues at 924.

At 924, control uses first rate channel access parameters when transmitting frames. Control continues at 932, where control waits until the restricted access window has expired, at which point control transfers to 936. At 936, control uses second rate channel access parameters for transmitting frames. For example only, the first rate may correspond to 1 MHz and the second rate may correspond to 2 MHz, or vice versa. The techniques of FIG. 10 may be used in combination with those in FIG. 9. For example only, when lower rate transmissions are detected according to FIG. 9, the restricted access window may be enabled in FIG. 10. Otherwise, control in FIG. 10 may omit specifying the restricted access window and simply use the 2 MHz channel access parameters for all communication after the DTIM.

Figure 11:
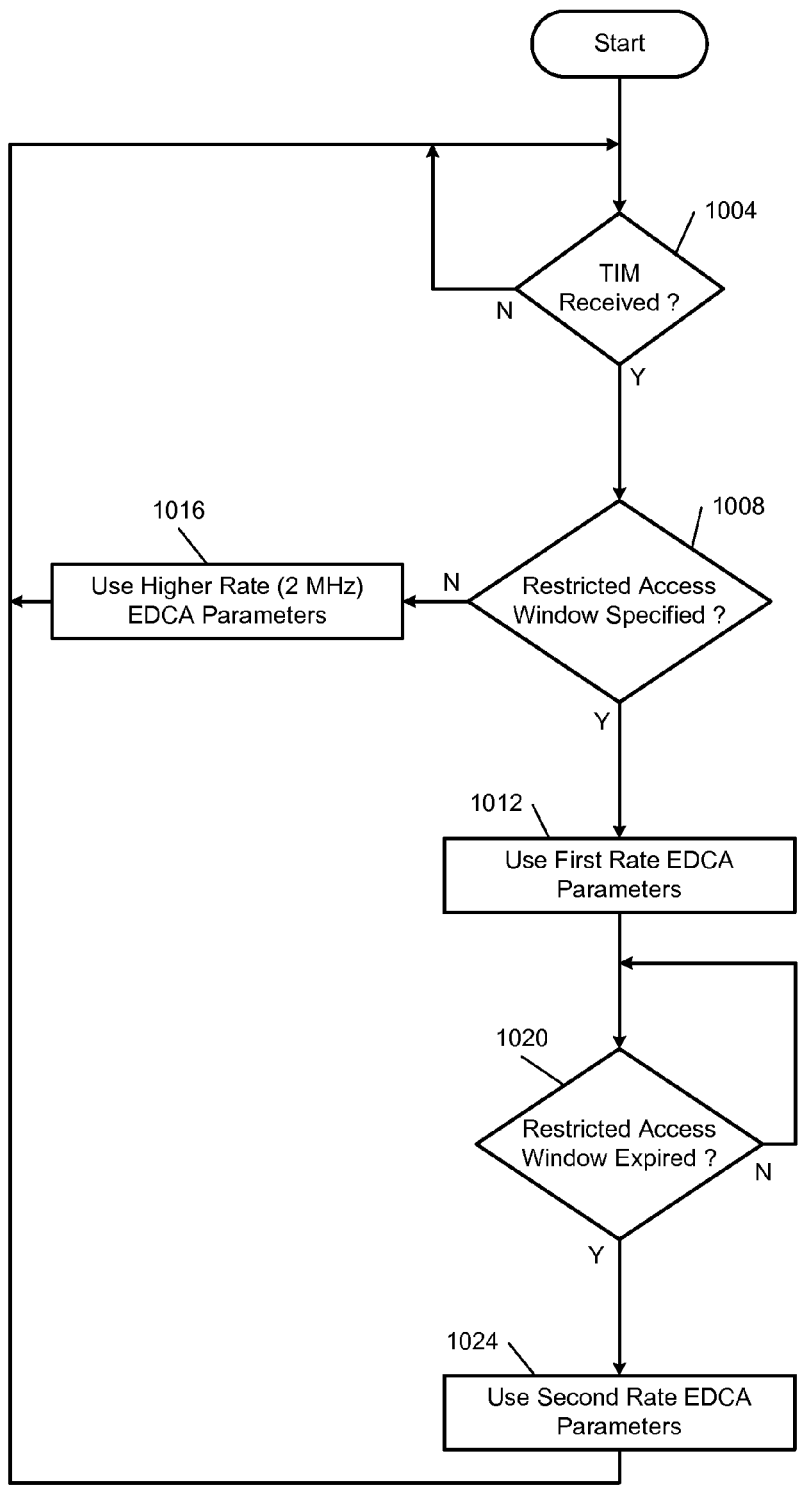
FIGS. 11 and 12 are flowcharts of example station operation.

In FIG. 11, a flowchart depicts example operation of a station. Control begins at 1004, where control waits until a TIM or DTIM is received. Control then continues at 1008, where if a restricted access window is specified, control transfers to 1012; otherwise, control transfers to 1016. At 1012, control uses first rate channel access parameters. Control then waits at 1020 until the restricted access window has expired.

Control then continues at 1024, where second rate channel access parameters are used. Control then returns to 1004. At 1016, control uses higher rate channel access parameters. Alternatively, the default when no specific access window is specified may be lower rate parameters. The first and second rates of FIG. 11 may correspond to 1 MHz and 2 MHz respectively, or vice versa.

Figure 12:
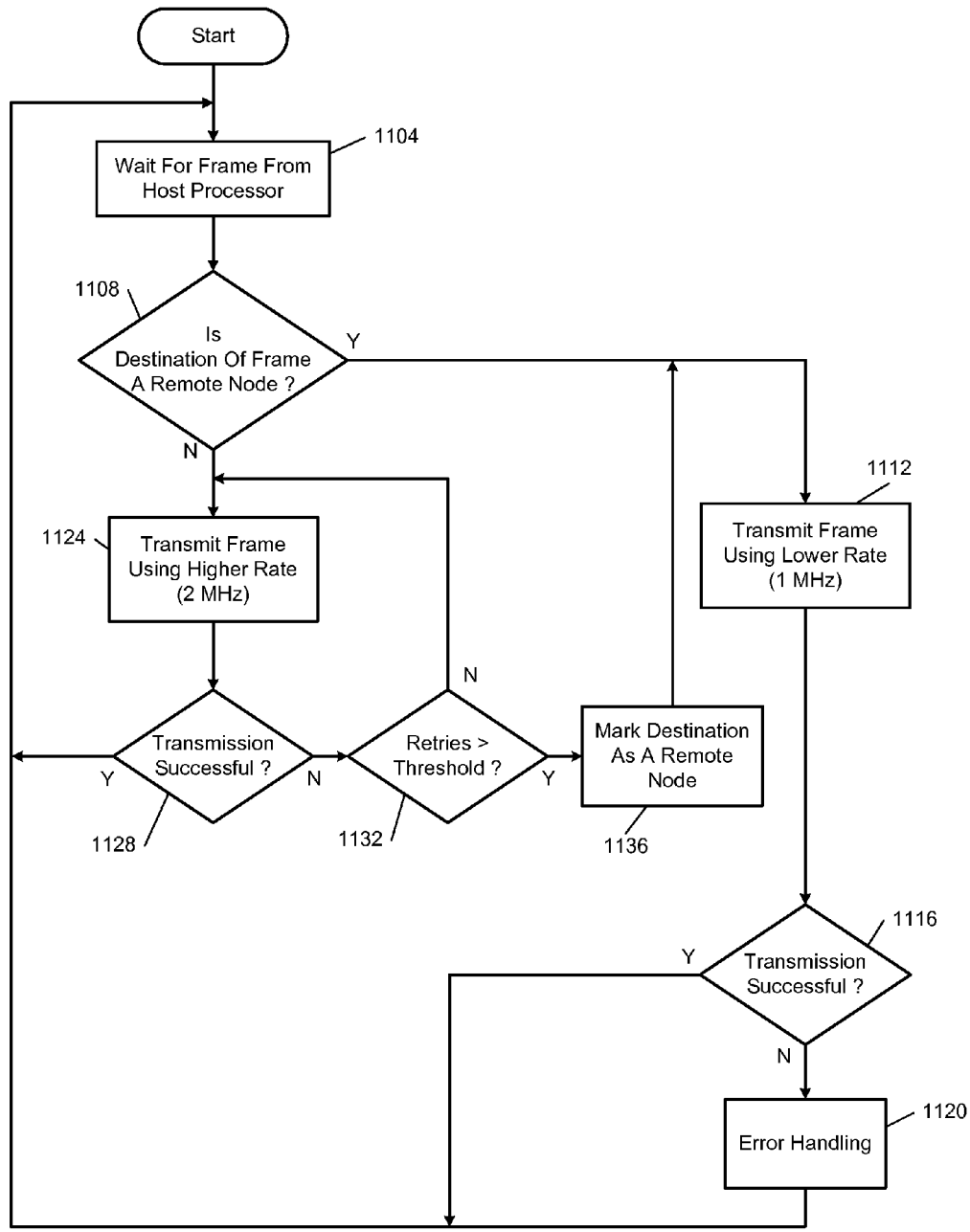

In FIG. 12, another flowchart depicting example operation of a station is presented. At 1104, control waits for a frame to be received from a host processor. At 1108, a MAC device determines whether the destination of the frame is considered to be a remote node. If so, control transfers to 1112, where control attempts to transmit the frame using the lower rate, such as 1 MHz. Control continues at 1116, where if transmission is successful, control returns to 1104. If transmission is not successful, control continues at 1120, where error handling is performed. Error handling may include incrementing a retry counter and reattempting transmission.

At 1108, if the destination of the frame is not considered a remote node, control transfers to 1124, where control attempts to transfer the frame using the higher rate, such as 2 MHz. If transmission is successful at 1128, control returns to 1104; otherwise, control transfers to 1132. If the number of retries for transmitting this frame exceeds threshold, control transfers to 1136; otherwise, control returns to 1124. At 1136, control marks the destination as a remote node and attempts to transmit the frame at the lower rate at 1112.

Figure 13:
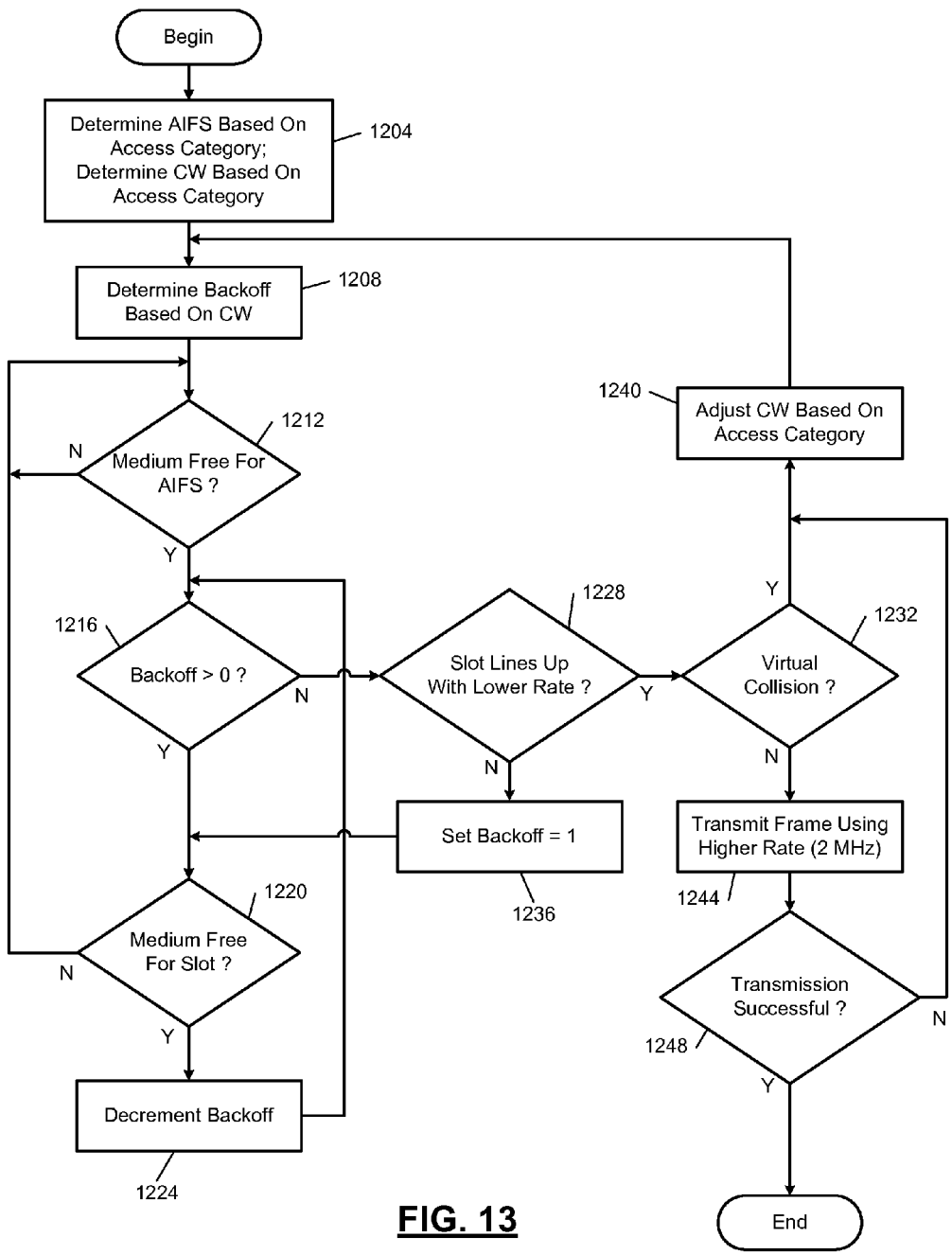
FIG. 13 is a flowchart of example network device operation for frame transmission.

In FIG. 13, another flowchart depicts example operation of a station. The operation of FIG. 13 may be invoked when transmission of a frame is requested. Control begins at 1204, where the arbitration interframe space (AIFS) is determined based on the access category of the frame. In addition, the contention window is determined based on the access category. In FIG. 13, the frame is to be transmitted using a 2 MHz channel and the channel access parameters are established as described in FIG. 5B, where the slot time of the 2 MHz rate is double that of the slot time of the 1 MHz rate. Control continues at 1208, where control determines the backoff by selecting a random number between zero and the contention window, inclusive.

Control continues at 1212, where if the medium is free for a period of time specified by AIFS, control transfers to 1216; otherwise, control remains at 1212. At 1216, if the backoff is greater than zero, control transfers to 1220. At 1220, if the medium remains free for the following slot, the backoff is decremented by one at 1224. Control then returns to 1216. At 1220, if the medium became busy during the slot, decrementing is halted and control returns to 1212. If the backoff was zero at 1216, control transfers to 1228.

At 1228, control determines whether the slot lines up with a lower rate slot. If so, control continues at 1232; otherwise, control transfers to 1236. At 1236, the backoff is set to one, thereby delaying the transmission until the following slot, which will be in alignment with a lower rate slot. Control then transfers to 1220 to ensure that the medium remains free for that delay slot.

At 1232, control determines whether a virtual collision is present. A virtual collision occurs when frames of different access categories are both scheduled to be transmitted beginning at the same slot. Although no physical collision takes place and retry counters are not updated, the virtual collision is otherwise treated as a collision, thereby causing the contention window to be adjusted at 1240. The contention window is adjusted based on the access category of the frame and control returns to 1208 to determine a new backoff time based on the adjusted contention window. If no virtual collision is present at 1232, control continues at 1244, where the frame is transmitted using the higher rate, such as 2 MHz. At 1248, if the transmission is successful, control ends; otherwise, a collision is assumed and control transfers to 1240 to adjust the contention window.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A wireless access point comprising:
a medium access control (MAC) circuit configured to generate a first traffic indication map, wherein the first traffic indication map announces a restricted access window; and
a physical layer device configured to
transmit a first beacon over a wireless medium, wherein the first beacon includes the first traffic indication map, wherein the restricted access window begins subsequent to transmission of the first beacon, and wherein the restricted access window ends prior to transmission of a second beacon, wherein the second beacon is transmitted subsequent to the first beacon with no intervening beacons,
during the restricted access window, access the wireless medium using a first set of channel access parameters, wherein the first set of channel access parameters includes a first short interframe space and a first slot time, and
subsequent to the restricted access window but prior to the transmission of the second beacon, access the wireless medium using a second set of channel access parameters, wherein the second set of channel access parameters includes a second short interframe space and a second slot time,
the first short interframe space and the second short interframe space are equal,
the second slot time and the first slot time are related by an integer multiple, and
the integer is greater than one.

2. The wireless access point of claim 1, wherein the physical layer device is configured to receive frames during the restricted access window using a channel having a first bandwidth.

3. The wireless access point of claim 2, wherein the physical layer device is configured to, subsequent to the restricted access window but prior to the transmission of the second beacon, receive frames using a channel having a second bandwidth.

4. The wireless access point of claim 3, wherein the first bandwidth is one of 1 MHz or 2 MHz, and the second bandwidth is the other of 1 MHz or 2 MHz.

5. The wireless access point of claim 1, wherein:
the first set of channel access parameters includes a first plurality of arbitration interframe space values corresponding to a plurality of access categories,
the second set of channel access parameters includes a second plurality of arbitration interframe space values corresponding to the plurality of access categories, and
the first plurality of arbitration interframe space values and the second plurality of arbitration interframe space values, respectively, are related by the integer multiple.

6. The wireless access point of claim 1, wherein:
the first set of channel access parameters includes a first plurality of minimum contention window values corresponding to a plurality of access categories,
the second set of channel access parameters includes a second plurality of minimum contention window values corresponding to the plurality of access categories, and
the first plurality of minimum contention window values and the second plurality of minimum contention window values are related, respectively, by the integer multiple.

7. The wireless access point of claim 6, wherein:
the first set of channel access parameters includes a first plurality of maximum contention window values corresponding to the plurality of access categories,
the second set of channel access parameters includes a second plurality of maximum contention window values corresponding to the plurality of access categories, and
the first plurality of maximum contention window values and the second plurality of maximum contention window values are related, respectively, by the integer multiple.

8. The wireless access point of claim 1, wherein the physical layer device is configured to omit transmitting the first traffic indication map until transmissions having a predetermined channel bandwidth are detected.

9. The wireless access point of claim 8, wherein the predetermined channel bandwidth is 1 MHz.

10. The wireless access point of claim 8, wherein the physical layer device is configured to, while omitting transmitting the first traffic indication map, periodically transmit second traffic indication maps, wherein the second traffic indication maps do not specify restricted access windows.

11. The wireless access point of claim 1, wherein the MAC circuit is configured to instruct the physical layer device to transmit the second beacon in response to a target beacon transmission time.

12. The wireless access point of claim 1, wherein the first traffic indication map comprises a delivery traffic indication map.

13. The wireless access point of claim 1, wherein the MAC circuit is configured to, immediately subsequent to the first beacon being transmitted, selectively instruct the physical layer device to transmit at least one of queued multicast data and queued broadcast data.

14. The wireless access point of claim 13, wherein the first traffic indication map indicates whether the queued multicast data and the queued broadcast data will be transmitted.

15. The wireless access point of claim 1, wherein:
the first traffic indication map specifies a second restricted access window,
the second restricted access window begins subsequent to the end of the restricted access window, and
the second restricted access window ends prior to the transmission of the second beacon.

16. The wireless access point of claim 15, wherein the second restricted access window begins immediately subsequent to the end of the restricted access window.

17. The wireless access point of claim 15, wherein the physical layer device is configured to, during the second restricted access window, access the wireless medium using the second set of channel access parameters.

18. A method of operating a wireless access point, the method comprising:
generating a first traffic indication map, wherein the first traffic indication map announces a restricted access window;
transmitting a first beacon over a wireless medium, wherein
the first beacon includes the first traffic indication map, and
the restricted access window begins subsequent to transmission of the first beacon;
transmitting a second beacon subsequent to the first beacon with no intervening beacons, wherein the restricted access window ends prior to transmission of the second beacon;
during the restricted access window, accessing the wireless medium using a first set of channel access parameters, wherein the first set of channel access parameters includes a first short interframe space and a first slot time; and
subsequent to the restricted access window but prior to the transmission of the second beacon, accessing the wireless medium using a second set of channel access parameters, wherein
the second set of channel access parameters includes a second short interframe space and a second slot time,
the first short interframe space and the second short interframe space are equal,
the second slot time and the first slot time are related by an integer multiple, and
the integer multiple is greater than one.

19. The method of claim 18, further comprising receiving frames during the restricted access window using a channel having a first bandwidth.

20. The method of claim 19, further comprising, subsequent to the restricted access window but prior to the transmission of the second beacon, receiving frames using a channel having a second bandwidth.

21. The method of claim 20, wherein the first bandwidth is one of 1 MHz or 2 MHz, and the second bandwidth is the other of 1 MHz or 2 MHz.

22. The method of claim 18, wherein:
the first set of channel access parameters includes a first plurality of arbitration interframe space values corresponding to a plurality of access categories,
the second set of channel access parameters includes a second plurality of arbitration interframe space values corresponding to the plurality of access categories, and
the first plurality of arbitration interframe space values and the second plurality of arbitration interframe space values, respectively, are related by the integer multiple.

23. The method of claim 18, wherein:
the first set of channel access parameters includes a first plurality of minimum contention window values corresponding to a plurality of access categories,
the second set of channel access parameters includes a second plurality of minimum contention window values corresponding to the plurality of access categories, and
the first plurality of minimum contention window values and the second plurality of minimum contention window values are related, respectively, by the integer multiple.

24. The method of claim 23, wherein:
the first set of channel access parameters includes a first plurality of maximum contention window values corresponding to the plurality of access categories,
the second set of channel access parameters includes a second plurality of maximum contention window values corresponding to the plurality of access categories, and
the first plurality of maximum contention window values and the second plurality of maximum contention window values are related, respectively, by the integer multiple.

25. The method of claim 18, further comprising omitting transmitting the first traffic indication map until transmissions having a predetermined channel bandwidth are detected.

26. The method of claim 25, wherein the predetermined channel bandwidth is 1 MHz.

27. The method of claim 25, further comprising, while omitting transmitting the first traffic indication map, periodically transmitting second traffic indication maps, wherein the second traffic indication maps do not specify restricted access windows.

28. The method of claim 18, further comprising transmitting the second beacon in response to a target beacon transmission time.

29. The method of claim 18, wherein the first traffic indication map comprises a delivery traffic indication map.

30. The method of claim 18, further comprising, immediately subsequent to the first beacon being transmitted, selectively transmitting at least one of queued multicast data and queued broadcast data.

31. The method of claim 30, wherein the first traffic indication map indicates whether the queued multicast data and the queued broadcast data will be transmitted.

32. The method of claim 18, wherein:
the first traffic indication map specifies a second restricted access window,
the second restricted access window begins subsequent to the end of the restricted access window, and
the second restricted access window ends prior to the transmission of the second beacon.

33. The method of claim 32, wherein the second restricted access window begins immediately subsequent to the end of the restricted access window.

34. The method of claim 32, further comprising, during the second restricted access window, access the wireless medium using the second set of channel access parameters.

\* \* \* \* \*